United States Patent [19]

Matye et al.

[11] Patent Number: 5,881,780
[45] Date of Patent: Mar. 16, 1999

[54] APAPRATUS FOR AND METHOD OF LOCATING THE CENTER OF AN OPENING IN A VEHICLE

[75] Inventors: Reinhard Matye, Chalevoix; Evard John Heath, Gaylord, both of Mich.

[73] Assignee: DCL, Inc., Charlevoix, Mich.

[21] Appl. No.: 906,060

[22] Filed: Aug. 5, 1997

[51] Int. Cl.⁶ .............................. B65B 1/00; B65B 1/04; B65F 9/00

[52] U.S. Cl. ......................... 141/232; 141/94; 141/192; 141/198; 141/231; 141/387; 141/388; 414/397; 414/808

[58] Field of Search .............................. 141/94, 198, 231, 141/232, 387, 388, 351, 192, 311 R, 317, 284, 250; 193/25 C; 414/299, 397, 808; 222/608; 250/559.06, 559.36, 201.7, 221; 340/686; 356/375; 198/571, 575

[56] References Cited

U.S. PATENT DOCUMENTS

| | | | |
|---|---|---|---|
| 840,863 | 1/1907 | Patterson | 222/608 |
| 887,805 | 5/1908 | Higgins | 340/686 |
| 3,241,243 | 3/1966 | Speer | 33/174 |
| 3,307,267 | 3/1967 | Barr et al. | 33/174 |
| 3,804,270 | 4/1974 | Michaud et al. | 214/16 B |
| 3,911,975 | 10/1975 | van Soestbergen | 141/95 |
| 3,924,666 | 12/1975 | Raison | 141/231 |
| 3,944,090 | 3/1976 | Flood | 214/152 |
| 4,065,005 | 12/1977 | Mahle et al. | 214/41 R |
| 4,102,367 | 7/1978 | Shulman et al. | 141/231 |
| 4,141,394 | 2/1979 | Lassman et al. | 141/284 |
| 4,224,968 | 9/1980 | Bosser et al. | 141/284 |
| 4,386,344 | 5/1983 | Vecchiatto | 340/680 |
| 4,402,350 | 9/1983 | Ehret et al. | 141/94 |
| 4,460,308 | 7/1984 | Moon et al. | 414/786 |
| 4,819,702 | 4/1989 | Gerlach | 141/232 |
| 4,980,570 | 12/1990 | Yasunaga et al. | 250/561 |
| 5,303,034 | 4/1994 | Carmichael et al. | 356/375 |
| 5,319,442 | 6/1994 | Rosser | 356/375 |
| 5,323,327 | 6/1994 | Carmichael et al. | 364/478 |
| 5,372,229 | 12/1994 | Leibling | 193/25 C |
| 5,415,512 | 5/1995 | Buchfink | 414/299 |

FOREIGN PATENT DOCUMENTS

| | | |
|---|---|---|
| 5436682 | 3/1979 | Japan . |
| 5872004 | 4/1983 | Japan . |
| 59180318 | 10/1984 | Japan . |
| 569513 | of 0000 | U.S.S.R. . |

*Primary Examiner*—Henry J. Recla
*Assistant Examiner*—Tuan N. Nguyen
*Attorney, Agent, or Firm*—Van Dyke, Gardner, Linn & Burkhart LLP

[57] ABSTRACT

A centering and loading apparatus for locating the center of a fill opening of a vehicle and loading bulk material into the vehicle through the opening is provided which includes a movable loading spout assembly and a locator assembly which locates the fill opening of the vehicle and is adapted to move the loading spout assembly for centering over the fill opening of the vehicle. The loading spout assembly is supported on a first support and is adapted to move along the longitudinal and lateral horizontal axes of the first support for aligning the loading spout assembly over the fill opening of the vehicle. The locator assembly includes a pair of scanning devices, for example, charge coupled devices, radio frequency sensors, and laser and infrared devices, that detect and scan the fill opening to locate the center of the opening. The locator assembly and loading spout are controlled by a programmable logic controller, which processes the data provided by the scanning devices to calculate the center of the opening. Once the center of the opening is calculated, the controller moves and centers the loading spout assembly over the opening and starts the loading sequence. A centering and loading method includes scanning the vehicle with scanning device, which preferably detects reflected light, locating the center of the fill opening from the signals generated by the scanning device, and aligning a loading spout with the center coordinates of the opening so that the vehicle can be loaded with the bulk material by the loading spout through the fill opening.

50 Claims, 8 Drawing Sheets

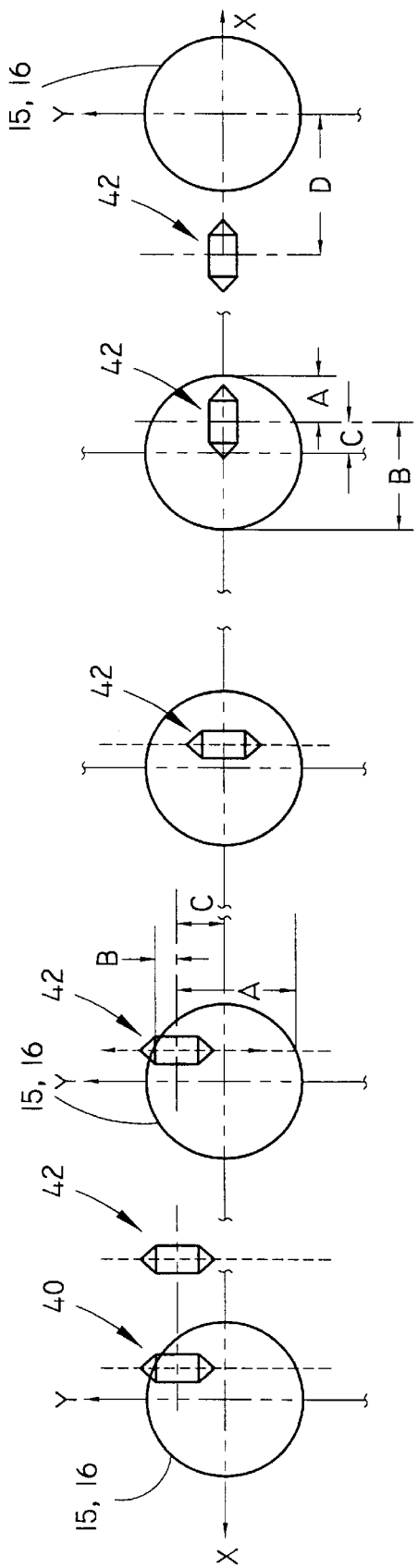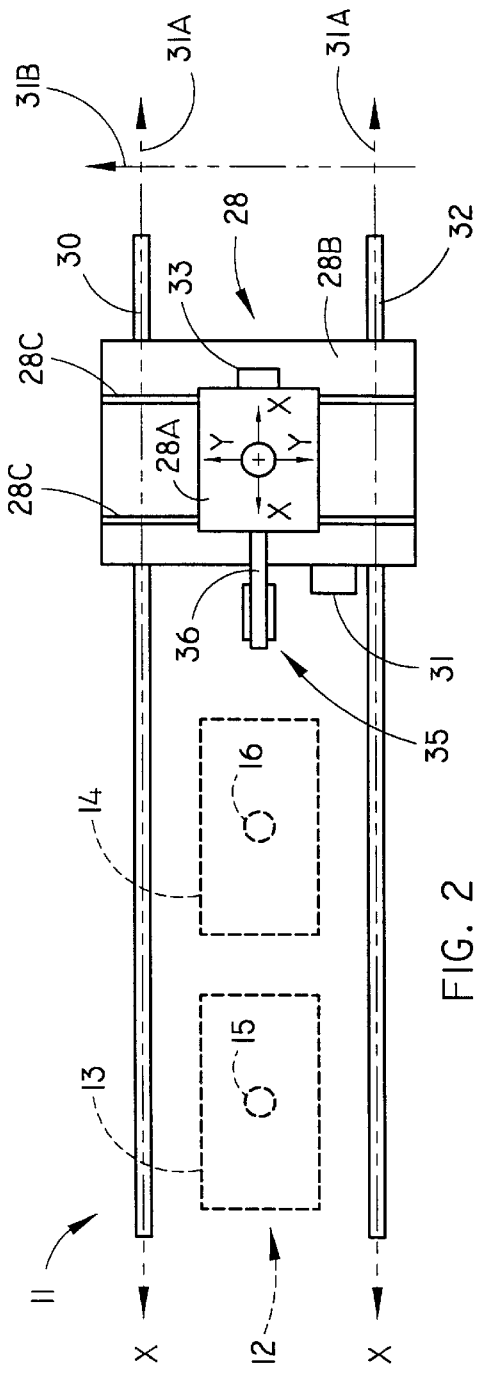

APAPRATUS FOR AND METHOD OF LOCATING THE CENTER OF AN OPENING IN A VEHICLE

TECHNICAL FIELD AND BACKGROUND OF THE INVENTION

The present invention relates to a method and apparatus for locating the center of a structure and, more particularly, to a method and apparatus for locating the center of an opening in a vehicle for loading bulk material into the vehicle through the opening.

Dry materials, such as ash, cement, coal, or chemicals, are often transported in bulk and contained in storage compartments of a vehicle, such as a truck, train, or boat. The materials are delivered to the storage compartments through extendable loading spouts which can be moved and aligned with a hatch or opening of the vehicle through the use of drivers, such as servo motors or air cylinders or the like, which are controlled by a loading station operator.

Although these loading spouts can be moved, their range of motion is limited; therefore, the driver of the vehicle must first maneuver the vehicle into the loading area in approximate alignment with the loading spout. The driver is typically guided by the loading station operator who is located in the loading area. After the vehicle is generally aligned, the operator of the vehicle then exits the vehicle and opens the hatches of the respective storage compartments which are to be filled with the material. Once the hatch or hatches are opened, the loading station operator guides the loading spout into proper alignment with the open hatch using conventional controls. If the vehicle has several storage compartments and the loading station includes a loading spout with a long enough range of motion, and after filling the first compartment, the operator must then move and center the loading spout over the next open hatch. Otherwise the vehicle must be moved forward by the driver under the direction of the loading operator to generally align the next open hatch with the loading spout. It can be appreciated, therefore, that using these conventional techniques, the loading process is time consuming. Moreover, this process is often imprecise. Despite the presence of loading operators who can view the fill opening from their stations, the process may take several passes to properly align the spout with the opening. Even small inaccuracies or errors can result in misalignments and spillage which increase the downtime for the vehicle and, ultimately, increase the cost of the material being transported.

While recent developments have improved the maneuverability of loading spouts and their range of motion, the process of aligning the loading spout with the open hatch of the vehicle is still time consuming and also subject to human error. Furthermore, since loading stations are typically used at irregular spaced intervals during the day, an operator must be stationed at the loading station full time order to provide adequate coverage, which adds a significant cost to the goods. Consequently, there is a need for an automated loading system that will reduce the loading time and will provide a more accurate alignment of the loading spout with the opening of the vehicle and will reduce the overall operating costs.

SUMMARY OF THE INVENTION

Accordingly, the present invention provides a new and unique centering and loading method and apparatus which is especially suited for locating the center of a fill opening of a vehicle and loading bulk material into the vehicle through the opening.

In one form of the invention, a bulk loading system includes a first support and a movable loading spout assembly adapted to move in at least one direction along at least a portion of one of the longitudinal horizontal axis and the lateral horizontal axis of the first support for aligning the loading spout assembly over a fill opening of a vehicle. A scanning device locates the fill opening of the vehicle and is coupled to the movable loading spout assembly and is adapted to actuate the loading spout assembly for centering over the fill opening of the vehicle.

In one aspect, the scanning device is mechanically coupled to the loading spout assembly. The loading spout assembly and the scanning device are coupled and respectively supported on a movable support, which is adapted to move along the horizontal axis of the first support and adapted to move the loading spout assembly and the scanning device along the lateral horizontal axis of the first support. Preferably, the scanning device is offset along the longitudinal horizontal axis from the movable support so that the loading spout assembly may be positioned for engaging the vehicle over the fill opening for delivering the material through the fill opening into the storage compartment of the vehicle.

In other aspects, the scanning device includes first and second scanning devices. The first scanning device is spaced from the second scanning device along the longitudinal horizontal axis for initially detecting and identifying the fill opening. The second scanning device measures the dimensions of the fill opening for locating the center of the fill opening. The first and second scanning devices are preferably supported in a housing. The bulk loading system also includes a controller which is in communication with the first and second scanning devices and the loading spout assembly. The controller generates actuating signals in response to signals from the first and second scanning devices to move the loading spout assembly for aligning the loading spout assembly with the fill opening. Preferably, the second scanning device is adapted to rotate from a first position wherein the second scanning device is aligned for measuring the fill opening along the longitudinal horizontal axis to a second position wherein the second scanning device is aligned for measuring the fill opening along the lateral horizontal axis. In this aspect, the scanning device is rotated in the housing by a driver, for example a motor.

In other aspects, the scanning device is electronically coupled to the loading spout assembly. The scanning device includes a first scanning device for detecting the presence of the fill opening and a second scanning device for locating the center of the fill opening of the vehicle. Preferably, the scanning devices include charged coupled devices, which generate signals wherein the magnitude of each signal is a function of the intensity of the reflective light off the vehicle. The scanning device is independently movably supported from the loading spout assembly.

In another form of the invention, a bulk loading system includes a first support, a movable loading spout assembly adapted to move along a longitudinal horizontal axis of the first support by a first driver and adapted to move along a lateral horizontal axis of the first support by a second driver for centering the loading spout assembly over the fill opening of the vehicle. A pair of scanning devices are coupled to the first and second drivers and are adapted to move along the longitudinal horizontal axis and the lateral horizontal axis of the first support for scanning the vehicle. The scanning devices are spaced apart and aligned along the longitudinal horizontal axis, with the first scanning device being adapted to scan the vehicle for detecting the location of the fill opening and the second scanning device being adapted to locate the center of the fill opening. Furthermore, the scanning devices are adapted to actuate the drivers to move the loading spout assembly for aligning with the center of the fill opening of the vehicle.

In one aspect, the scanning devices comprise charge coupled device cameras which measure the light reflected off the vehicle and generate signals proportional to the measured light. As a result, the cameras can be used to detect the location of an opening by detecting a contrast between the light reflected off the body of the vehicle and light reflected from the fill opening. In a further aspect, at least one light is provided for directing light toward the vehicle to enhance the contrast between the body of the vehicle and the fill opening.

In another aspect, the bulk loading system further includes a controller. The controller is coupled to the first and second scanning devices and the first and second drivers. The controller is adapted to receive signals from the first and second scanning devices and to actuate the first and second drivers in response to the signals to move the loading spout for aligning the loading spout with the center of the fill opening. Preferably, the controller receives a first detection signal from the first scanning device and a second detection signal and a plurality of measuring signals from the second scanning device. The controller actuates the first driver to move the loading assembly at a first speed for initially locating the fill opening and actuates the first driver to move the loading assembly at a second speed when the second signal is detected. The controller is adapted to determine the coordinates of the center of the opening from the measuring signals and to actuate the first driver and the second driver in response to the measuring signals to align the loading spout with the center of the fill opening.

In yet another form, a method of centering and loading bulk material into a storage compartment of a bulk transport vehicle through a fill opening includes moving a scanning device across the vehicle and scanning the vehicle with the scanning device. The center of the opening is located using the signals from the scanning device. Once the center is located, the loading spout is aligned with the center coordinates of the opening, and the bulk material is loaded into the vehicle with the loading spout through the fill opening.

In one aspect, the scanning device measures the distance from the center of the scanning device to the edges of the opening. The center coordinates of the fill opening are then calculated from these distances, and the loading spout is driven to align with the center of the fill opening.

In one aspect, the vehicle is scanned with a first scanning device at a first speed to locate the fill opening, then scanned with a second scanning device at a second speed until the second scanning device locates the fill opening. The scanning devices are stopped, and the distances from the center of the second scanning device to the edges of the opening along a first chord of the opening are measured with the second scanning device to determine the center of the chord. The second scanning device is then moved to the center of the first chord and rotated to measure the distances from the center of the second scanning device to the edges of the opening along a second chord. The center coordinates of the opening are then determined from the centers of the first and second chords.

In other aspects, the scanning devices measure light reflected off the vehicle. Preferably, light is directed toward the vehicle to increase the contrast between the light reflected off the body of the vehicle and the light reflected from the fill opening.

As will be understood, the centering and loading assembly of the present invention provides numerous advantages over prior known centering methods and loading assemblies used to bulk load material into storage compartments of a vehicle. The centering and loading assembly eliminates the iterative steps presently required in centering a conventional loading assembly over an open hatch of a vehicle. The loading assembly of the present invention is centered and aligned with the open hatch by a programmable logic controller which receives the coordinates of the open hatch through the use of scanning devices. Therefore, the present centering assembly is independent from a human eye and, consequently, free from human error. The scanning devices may be mechanically coupled to the loading assembly or electrically coupled to the loading assembly via the programmable logic controller. Consequently, the loading time and occurrences of misalignment are reduced.

These and other objects, advantages, purposes and features of the invention will become more apparent from a study of the following description taken in conjunction with the drawings.

DESCRIPTION OF THE DRAWINGS

FIG. 2 is a plan view of the loading station with the loading assembly in the non-loading position;

FIGS. 6A–6E illustrate the positions of the position scanning device as it measures the dimensions of the fill opening;

DETAILED DESCRIPTION OF THE PREFERRED EMBODIMENTS

Figure 1:
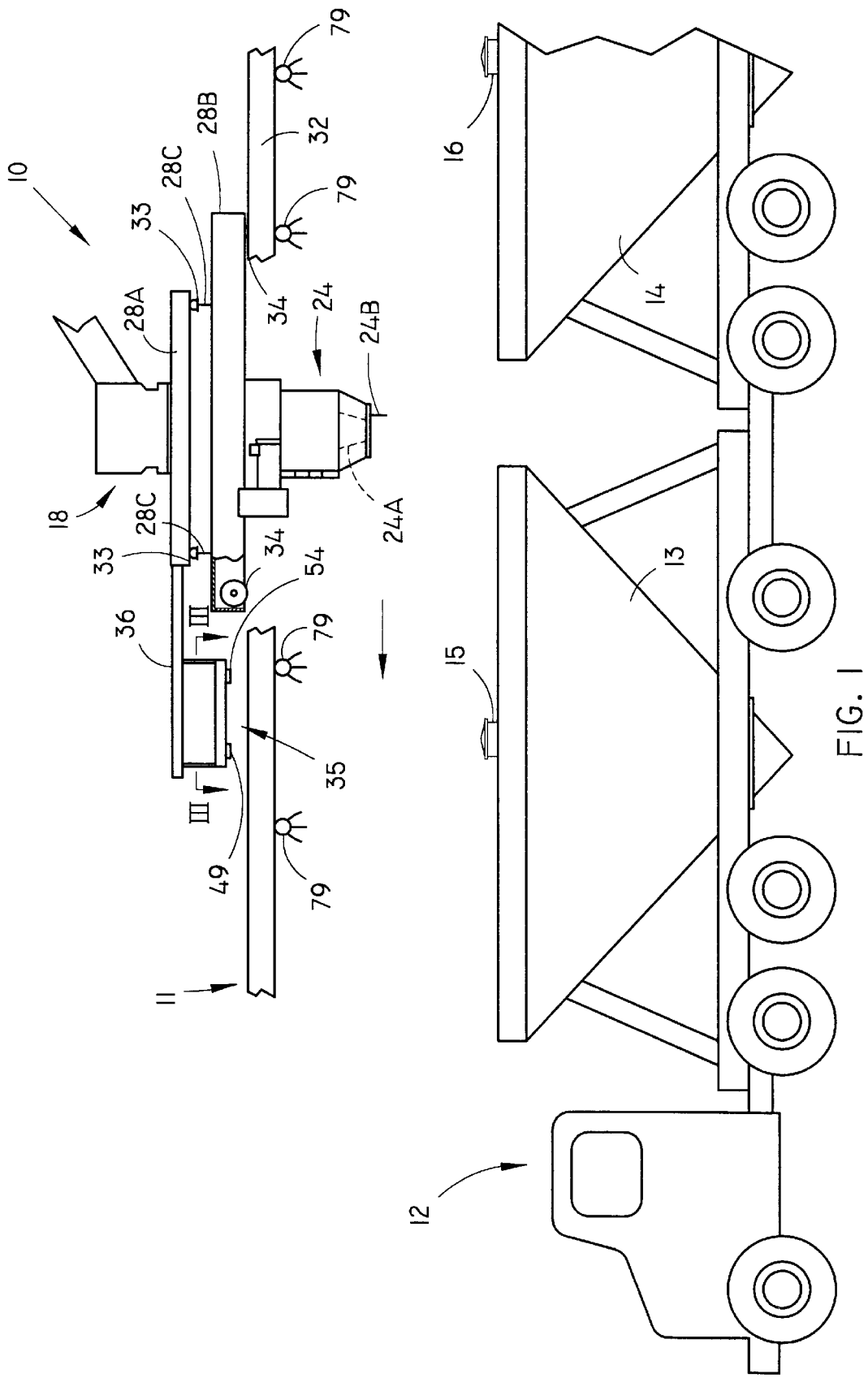
FIG. 1 is an elevational view of a vehicle positioned in a loading area with a first embodiment of the centering and loading assembly of the present invention in a non-loading position.

Referring to FIG. 1, a first embodiment 10 of the centering and loading apparatus 10 of the present invention is shown positioned in a non-loading or home position in a loading bay or area 11 above a bulk transport vehicle 12. In the illustrated embodiment, bulk transfer vehicle 12 comprises a dual trailer truck which includes two storage compartments 13 and 14. Each storage compartment 13, 14 includes a fill opening 15, 16, respectively, such as a hatch, through which the material is loaded into the respective compartment 13, 14 of vehicle 12 by centering and loading apparatus 10. In order to locate the fill openings (15, 16), centering and loading apparatus 10 includes a locator assembly 35 which scans the vehicle and detects the contrast between the openings and the body of vehicle 12 to locate and measure the coordinates of the respective openings, as will be more fully explained.

Figure 7:
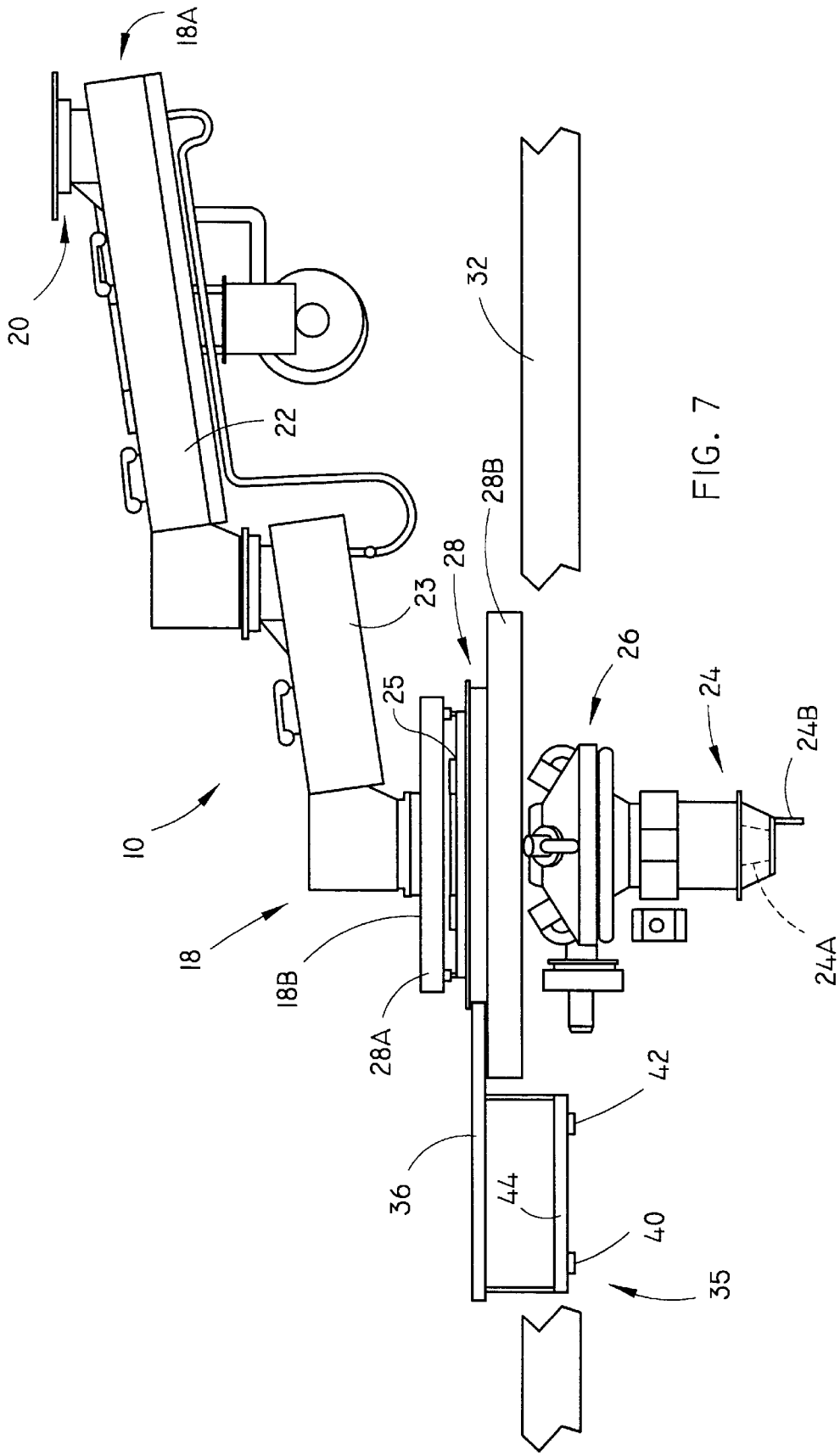
FIG. 7 is an enlarged side elevation of the articulating arm of FIG. 1.

As best seen in FIG. 7, centering and loading apparatus 10 includes an articulating conveyor 18 which delivers bulk material from a product inlet 20 through a series of articulating conveyor members 22, 23 to an extendable loading spout 24 which is moved up and down loading bay 11 for loading the material into vehicle 12 through openings 15, 16. Loading spout 24 preferably includes a self sealing cone 24a which reduces spillage of the bulk material being loaded into vehicle 12. Centering and loading apparatus 10 also can include a hopper 25, a compact filter module 26, which in the illustrated embodiment is positioned between the conveyor discharge and extendable loading spout 24, for withdrawing the air from storage compartments 13, 14 that is displaced when the bulk material is loaded into vehicle 12. While in the illustrated embodiment, compact filter module 26 is in line with loading spout 24, it should be understood that centering and loading apparatus 10 may include an external or remote compact filter module instead which is in fluid communication with loading spout 24 through internal or external duct work (not shown).

Articulating conveyor 18 is supported at one end 18a at or near product inlet 20 by a platform (not shown) where the bulk material is delivered through a bin or hopper or conveyor. The second end 18b of articulating conveyor 18 is in fluid communication with the compact filter module 26 and loading spout 24 and is supported on a movable support 28 that permits the second end 18b of articulating conveyor 18, compact filter module 26, and loading spout 24 to move along and across loading bay 11 to adjust the position of loading spout 24 and align loading spout 24 with opening 15 or 16. The articulating conveyor 18, compact filter module 26, movable support 28, and loading spout 24 are commercially available from DCL, Inc. of Charlevoix, Mich. under Model Nos. APA-8x6; APA-15x10; APA-18x12; CFM-155; CFM-195; CFM-270; CFM-330; EV-24; and EV-32 and reference herein will be made primarily to their function as opposed to their construction.

Referring to FIG. 2, support 28 is movably supported in loading bay 11 by a pair of spaced apart, parallel tracks or rails 30 and 32 on a set of bearing assemblies 34 (FIG. 1), such as rollers, wheels or the like. Bearing assemblies 34 are secured to a base member 28b of support 28 and permit longitudinal adjustment of loading spout 24 along the longitudinal horizontal axes 31a or X-axes of rails 30, 32. In order to provide lateral adjustment of spout 24 along the lateral horizontal axes 31b or Y-axes of rails 30, 32, support 28 includes a platform 28a which is movably mounted to base 28b on a pair of spaced, parallel rails 28c. In a similar manner to base 28b, platform 28a is supported on rails 28c by a plurality of bearing assemblies 33 (FIG. 1), such as rollers, wheels, or the like. In this manner, support 28 provides both lateral and longitudinal adjustment of loading spout 24 with respect to the loading bay 11.

Support 28 is moved along rails 30 and 32 by an X-driver 31, such as a servo motor, AC frequency drive, pneumatic motor, air cylinder, or the like. In a similar manner, platform 28a is moved along base 28b by a Y-driver 33, such as a servo or pneumatic motor or air cylinder or the like. In this first embodiment 10, articulating conveyor 18 has a range of motion which permits loading spout 24 to be repositioned by support 28 over both fill openings 15, 16 of bulk transport vehicle 12 so that both containers 13 and 14 may be filled without moving the vehicle 12.

The positions of the support 28 and loading spout 24 are controlled by a locator assembly 35. Locator assembly 35 detects the presence of openings 15 and 16 and provides coordinate information about openings 15, 16 so that the center of the respective openings can be calculated and used by a controller, which actuates X- and Y-drivers 31 and 33 of movable support 28 to move and center loading spout 24 over the respective openings 15, 16 of vehicle 12, as will be more full described below.

Figure 3:
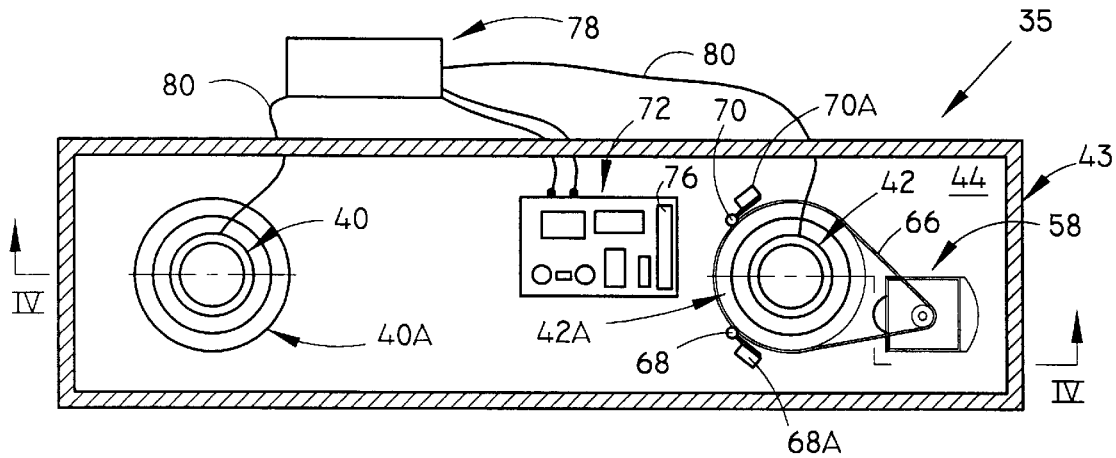
FIG. 3 is a cross-sectional view taken along line III—III of FIG. 1 illustrating a lead scanning device and a position scanning device.
Figure 4:
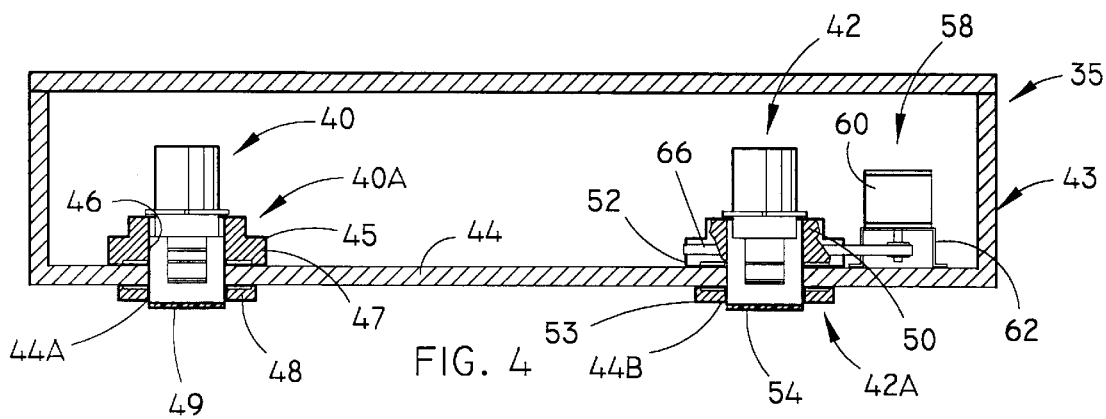
FIG. 4 is a cross-sectional view taken along line IV—IV of FIG. 3.

As best seen in FIGS. 1 and 2, locator assembly 35 is rigidly coupled to support 28 and cantilevered by a rigid structural member 36 from platform 28a and is offset from support 28 so that locator assembly 35 does not interfere with the filling process nor is coated with the material being loaded, as will be more fully understood in reference to the description of locator assembly 35. Referring to FIGS. 3 and 4, locator assembly 35 includes a pair of scanning devices 40 and 42. Scanning devices 40 and 42 are preferably scanning cameras and, most preferably, line scan CCD cameras, available from Bueno Systems, Inc. Scanning devices 40 and 42 are mounted in a locator housing 43, which aligns scanning devices 40 and 42 along the longitudinal horizontal axes 3 la of rails 30 and 32.

Scanning device 40 is positioned ahead or upstream of scanning device 42 to provide a high speed search or lead device which defines a lead scanning device. As best seen in FIG. 4, scanning device 40 is mounted to a bottom wall 44 of housing 43 by a camera mount 40a which extends through an opening 44a provided in bottom wall 44. Camera mount 40a includes a generally cylindrical body 45, with a transverse passage 46 and a mounting flange 47, and a retaining ring 48, which threads onto the end of cylindrical body 45 to secure scanning device 40 to bottom wall 44 in a fixed position. Mounted to the open end of cylindrical body 45 is a lens cap 49, preferably a transparent lens cap, which directs the light reflecting off vehicle 12 to the charge coupled device (CCD) array of scanning device 40 so that the intensity of the reflected light can be measured.

Figure 5:
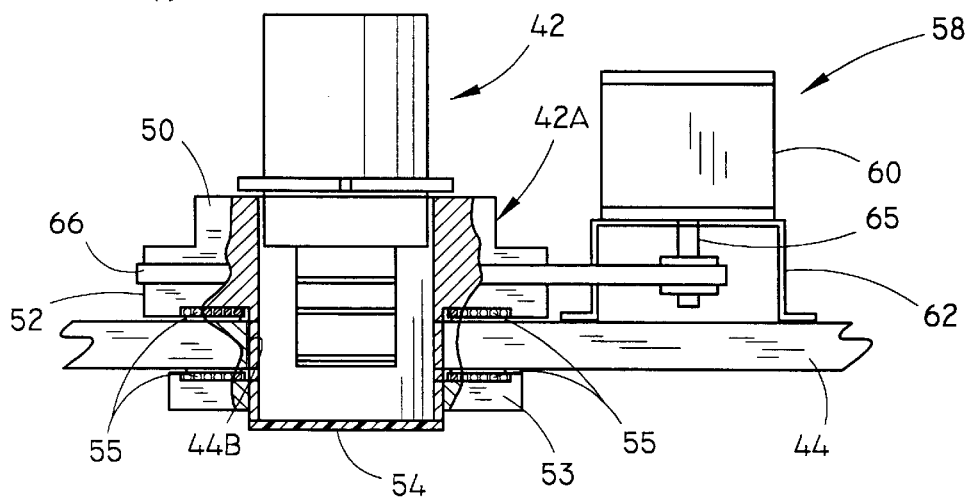
FIG. 5 is an enlarged cross-sectional view of a portion of FIG. 4 showing the position scanning device.

Scanning device 42 provides a position scanning device and is preferably rotatably mounted in housing 43. Scanning device 42 is mounted to bottom wall 44 in a camera mount 42a, which extends through opening 44b of bottom wall 44. Similar to camera mount 40a, camera mount 42a includes a cylindrical body 50, with a transverse passage 51 and mounting transparent flange 52, and a retaining ring 53, which mounts scanning device 42 to bottom wall 44. A lens cap 54 is secured to the open end of cylindrical body 50 of camera 30 mount 42a, similarly to direct the reflected light off vehicle 12 to the charged coupled device array of scanning device 42. Similar to lens cap 49, lens cap 54 is preferably transparent. Camera mount 42a is mounted to bottom wall 44 on thrust bearings 55 (FIG. 5) which are interposed between mounting flange 52 and bottom wall 44 and between retaining ring 53 and bottom wall 44, which permit camera mount 42a to rotate in opening 44b of bottom wall 44.

Camera mount 42a and scanning device 42 are rotated by a drive assembly 58 which includes a motor assembly 60 and a belt 66, for example a toothed timing belt or gear drive. Motor assembly 60 is preferably a stepper motor and includes a drive shaft 65 which is drivingly coupled to camera mount 42a by belt 66. Belt 66 extends around drive shaft 65 and mounting flange 52 of camera mount 42a to drivingly couple motor assembly 60 to camera mount 42a and scanning device 42. In order to limit the rotation of scanning device 42, camera mount 42a includes a pair of travel stops 68 and 70 (FIG. 3) which actuate limit switches 68a 10 and 70a (FIG. 3) which are mounted to bottom wall 44 and limit the rotational movement of scanning device 42 and its mount 42a between a first position and a second position that are ninety (90) degrees apart. Travel stops 68 and 70 and switches 68a and 70a are also commercially available micro type switches.

Figure 8A:
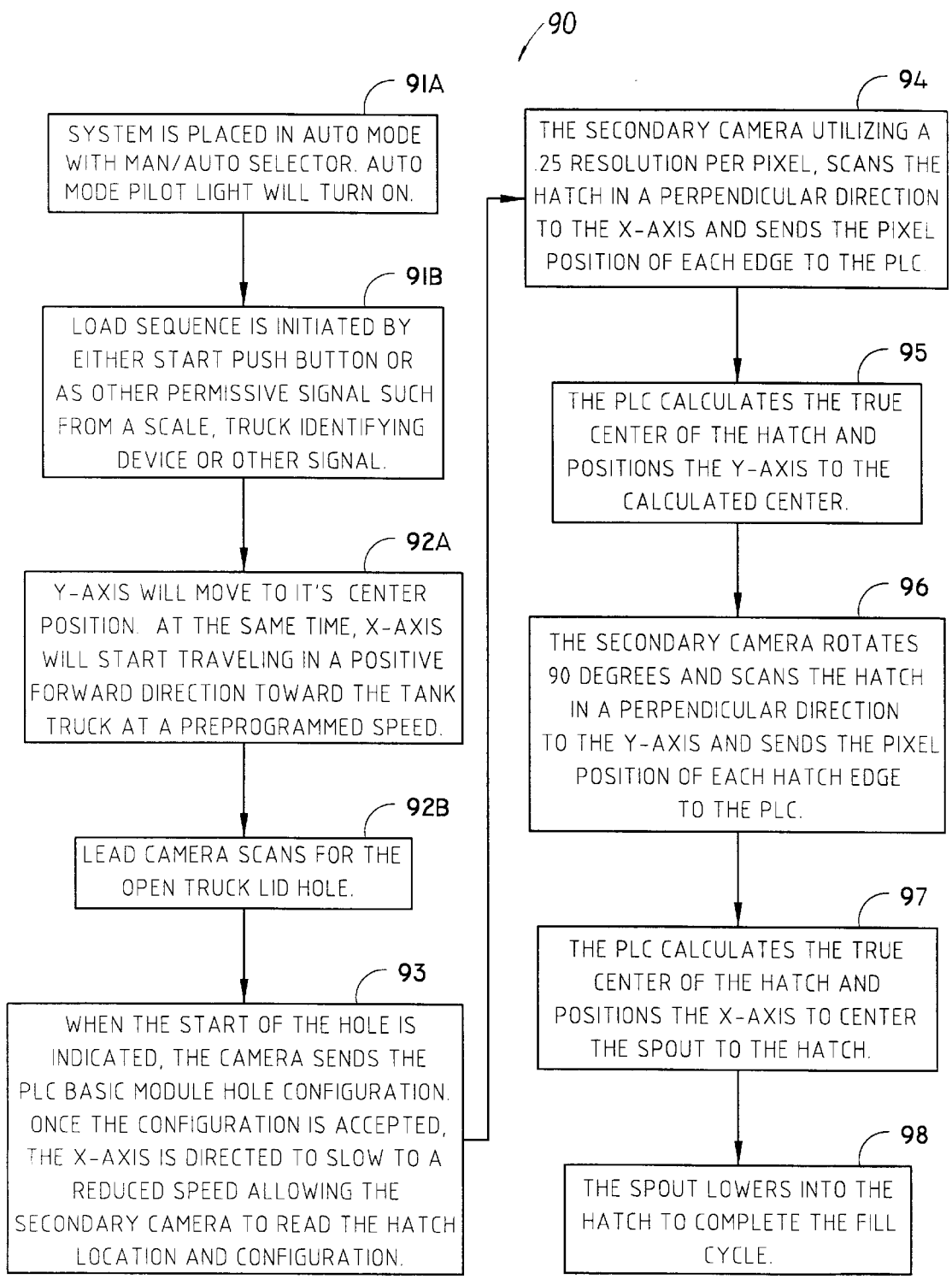
FIG. 8A is a flow chart illustrating the program for the centering process.
Figure 8B:
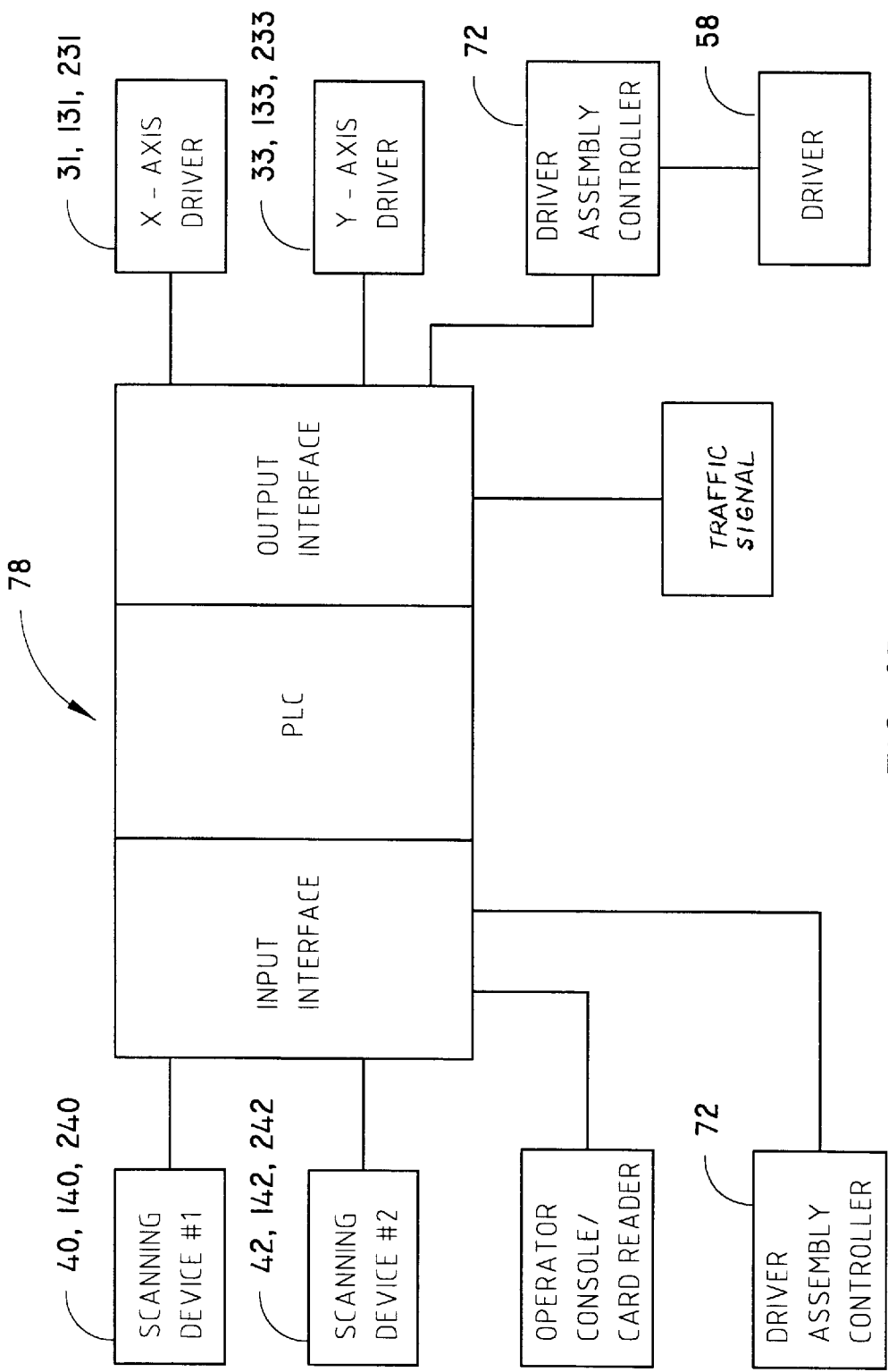
FIG. 8B is schematic diagram of a control circuit.

Drive assembly 58 is controlled by a motor drive controller 72 (FIG. 3), which is similarly supported in housing 43. Motor drive controller 72 preferably includes a variable speed controller for actuating motor assembly 60 in forward and reverse directions which is electrically coupled to a controller 78 (FIGS. 4 and 8B), preferably a programmable logic controller (PLC), which actuates motor driver controller 72 to the 90° position when the signal is released, controller 72 actuates motor to the 0° position. Referring to FIG. 8B, PLC 78 is coupled to scanning devices 40 and 42 and controls the movement of movable support 28 and platform 28a, and the operation of articulating conveyor 18, based on information received from scanning devices 40 and 42, by actuating drivers 31 and 33. It should be understood that PLC 78 may be electrically coupled to drivers 31 and 33 or may send RF signals via a transmitter, which are received by a receiver provided on movable support 28 and electrically coupled to drivers 31 and 33.

Scanning devices 40 and 42 scan vehicle 12 and detect the contrast between the body of vehicle 12 and openings 15 and 16. When a contrast is detected, scanning devices 40 and 42 generate signals that are used by controller 78 to determine the location of a respective opening (15 or 16) and to determine its center. In order to enhance the contrast between the body of vehicle 12 and openings 15 and 16 a plurality of lights 79 (FIG. 1), preferably metal halide, such as halogen lights or laser beam lumination or coherent type lights, may be mounted in loading area 11 and directed toward vehicle 12. As best seen in FIGS. 6A–6E, scanning devices 40 and 42 preferably operate in the following overall sequence: Scanning camera 40 initially identifies the presence of an opening 15 or 16 by detecting the contrast in the intensity of the light reflected from the vehicle compared to the open hatch, which is generally dark and does not reflect light. Once scanning device 40 detects the presence of an opening 15 or 16, scanning device 42, which is in the first position, measures the distances from the center of scanning device to the edges of the respective opening 15, 16 along the lateral horizontal axis 31b. After these dimensions are measured and the location of the Y-axis centerline is determined, as will be more fully explained below, scanning camera 42 is moved and aligned along the Y-axis centerline of the opening and rotated ninety degrees by driver assembly 58. Scanning camera 42 then measures the distances from the center of scanning camera 42 to the edges of the respective opening along longitudinal horizontal axis 31a. At which point the location of X-axis centerline of the opening 15 or 16 and center of the opening can be calculated so that loading spout 24 can be centered with the opening 15 or 16, which will be more fully explained below.

As described previously, scanning devices 40, 42 most preferably comprise line scan CCD cameras, which include microprocessor controlled linear charge coupled device (CCD) arrays and lens assemblies. Charged coupled devices or CCDs are constructed as long shift registers in semiconductor material. A CCD camera includes a plurality of shift registers built in parallel on the same chip. A photodiode is doped under every other gate. Light shining onto the photodiodes cause a charge proportional to the light intensity to be put in each well which has a diode. These charges are then shifted out to produce the dot-by-dot values for the scan lines of an object.

Each device 40, 42 is coupled to programmable logic control (PLC) 78 through a high speed serial communication link 80 which enables devices 40, 42 to down load the dot-to dot values of the line scan on a continuous basis to PLC 78 (FIG. 3). As described previously, lead scanning device 40 is used to identify the existence of an opening 15 or 16 on vehicle 12 and is moved relatively quickly along loading bay 11, for example 20 inches per second. Whereas, scanning device 42 is used to compute the actual hatch position coordinates in both the longitudinal horizontal axis or X-axis and lateral horizontal axis or Y- axis, as described above. As is also described above, CCD cameras consist of a large number of charge coupled devices which output electrical signals corresponding to the intensity of the light incident on the device. Therefore, as scanning devices 40, 42 are moved over vehicle 12, scanning devices generate electrical signals which are proportional to the intensity of the light reflected off vehicle 12. When scanning device 40 or 42 passes over an opening, the signal will change-this change in signal is detected by the PLC 78.

As described above, the contrast between openings 15, 16 and the body of vehicle 12 is increased by lights 79 which provides a sharper contrast in the signal change as the scanner moves over one of the openings. Therefore, when lead scanning device 40 first detects one of the openings 15 or 16 of vehicle, the electrical signal of scanning device 40 will exhibit a noticeable decrease in its magnitude since the opening will appear dark in contrast to the body of vehicle 12. This change in magnitude of the electrical signal from scanning device 40 generates a "HATCH DETECTED" signal. When PLC 78 receives the "HATCH DETECTED" signal from scanning device 40, PLC 78 generates a "SCAN SPEED" signal or command to the X- axis driver so that X-axis driver 31 moves support 28, loading spout 24, and scanner assembly 35 at a slower speed, for example, four inches per second. In this mode, PLC 78 is reading the signals from second scanning device 42. As support 28 moves forward, second scanning device 42 continues to generate signals. When scanning device 42 detects the opening (15 or 16) (FIG. 6B), it also generates a "HATCH DETECTED" signal. When PLC 78 receives this second "HATCH DETECTED" signal, PLC 78 generates a "STOP" signal or command which is sent to the X-axis driver, such that support 28 is stopped with scanning device 42 aligned over at least a portion of one hatch opening 15, 16.

When support 28 comes to a complete stop, scanning device 42 measures the distances from the center of scanning device 42 to the edges of the opening 15, 16 along the lateral longitudinal axis 31b or Y-axis and sends these dimensions to PLC 78, which computes the hatch opening coordinates along Y- axis. Referring to FIG. 6B, PLC 78 subtracts the "B" dimension from the "A" and divides the result by two to determine the distance scanning device 42 must be moved to be aligned on the centerline of the opening. PLC 78 then actuates Y-axis driver 33 to move scanning device 42 to the centerline of the opening 15, 16 as shown in FIG. 6C. Once moved to the centerline, PLC 78 actuates driver assembly 58 to rotate scanning device 42 ninety (90) degrees to the second position (FIG. 6D). In this second position, scanning device 42 measures the distances from its center to the edges of the opening 15, 16 and transfers this information to PLC 78, which subsequently computes the Y-axis centerline and center of the opening using the same equation: (A−B)/2=C. Once the center of the opening is located, PLC 78 actuates X-driver 31 and Y-driver 33 to move scanning device 42 past the centerline of the opening 15, 16 by an offset "D" (FIG. 6E) and to align loading spout 24 with the centerline of the opening for loading.

At this point, the loading spout 24 is centered over the open hatch or fill opening 15, 16 along both the X and Y axes. PLC 78 then actuates loading apparatus 10 to extend and lower spout 24 onto the open hatch until the spout is properly seated on the open hatch. The truck weight is preferably tared or weighed before the loading process is started. PLC 78, which is in communication with the truck weighing system, then initiates the loading process. Vehicle 12 is loaded with a product to a specified amount and the loading process is then stopped. In order to prevent over filling, loading spout 24 preferably includes a level sensing probe 24b, for example, an electronic or mechanical probe, which are conventional in the art. After the loading process is complete, loading spout 24 is raised to its retracted position above vehicle 12 in loading bay 11. At this point, the second open hatch or fill opening 15 or 16 will be detected in the same manner as the first open hatch or fill hole as described above. If vehicle 12 includes only a single hatch, then the process is complete.

It should be understood that other equipment may be added to centering and loading apparatus 10 to enhance the loading process. For example, centering and loading apparatus 10 may include a graphic interface terminal (not shown) or annunciator, which can be used to provide feedback on the system status and to aid the driver or an operator in the event of an error or failure in the system. This graphic display terminal could provide fall system status and can identify the source of the problem to aid in the rapid detection of any problem.

Furthermore, centering and loading apparatus 10 may include a console and/ or a card reader (not shown) which can be operated by the driver of the vehicle 12. The console and card reader may be electrically coupled to PLC 78. The console preferably includes a start button or the like which when pressed initiates an automatic loading sequence. Referring to FIG. 8A, in the automatic loading sequence, loading spout 24 is moved to its center position along the Y-axis (91a, 91b). This places the locator assembly 35 directly in the middle of loading bay 11. Starting from the home position, which is shown in FIG. 2, loading spout 24 and scanner assembly 35 move forward down loading bay 11 in the direction shown by the arrow in FIG. 1 along X-axis. Lead scanning camera 40 scans for the fill opening 15, 16 and signals to PLC 78 that the opening has been detected (92a, 92b). When the start of the hole is detected, camera 40 sends PLC 78 a signal and PLC 78 signals the X-axis driver to slow to a reduced speed (93) to allow position scanning device 42 to read opening 15 or 16. Preferably, scanning device 42 uses a 0.25 inch per pixel resolution and scans the width of opening 15, 16 along the Y-axis and sends the pixel position of each edge of opening 15, 16 to PLC 78 (94).

PLC 78 calculates the center of opening 15, 16 along the Y-axis and actuates the Y-axis driver to align scanning device 42 along the centerline of opening 15, 16 (95). PLC 78 actuates driver assembly 58 to rotate scanning device 42 so that scanning device 42 scans the open hatch 15, 16 along the X-axis and sends the pixel position of each edge of opening 15, 16 to PLC 78 (96). PLC 78 then calculates the center of the respective opening 15, 16 and centers loading spout 24 over opening 15, 16 (97). Once loading spout 24 is aligned, PLC 78 actuates loading spout 24 to lower onto the respective opening 15 or 16 (98).

The console may also provide for a manual mode. In a manual mode, the driver or operator has full control over the X-axis and Y-axis drivers through the use of push buttons on the control console. Preferably, the control console includes one or more lights to indicate the mode selected by the operator.

Figure 9:
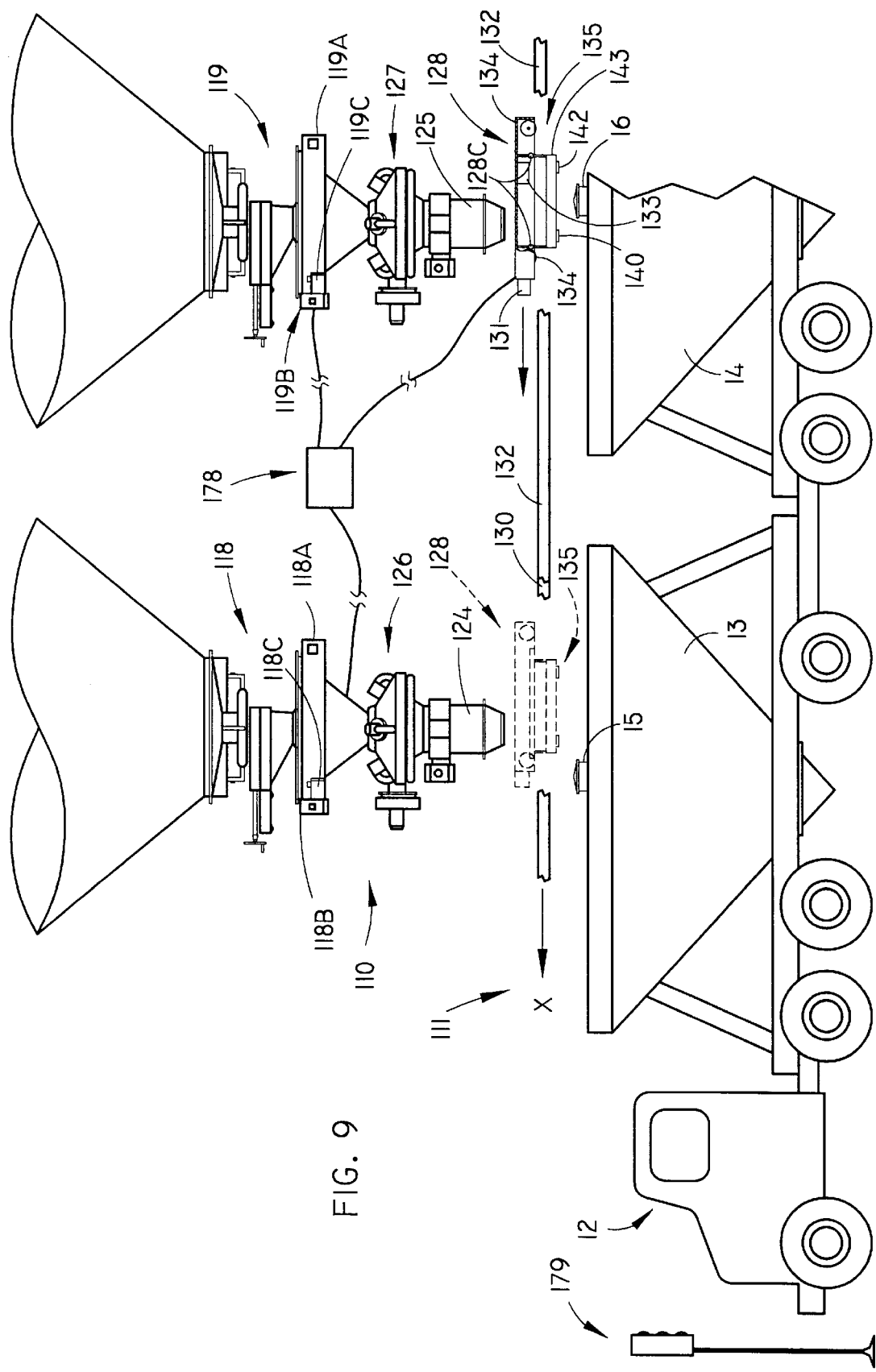
FIG. 9 is a side elevational view of the vehicle positioned in the loading area under a second embodiment of the centering and loading assembly of the present invention.

In reference to FIG. 9, a second embodiment 110 of the present invention is illustrated. Centering and loading system 110 includes a pair of extendable loading spouts 124, 125 with respective compact filter modules 126, 127. Each loading spout 124, 125 is aligned over a respective opening 15, 16 of vehicle 12 so that the containers 13 and 14 may be filled simultaneously to reduce the down time of the truck in the loading bay. However, it should be understood that storage containers 13, 14 may also be filled in sequence. The position of each loading spout 124, 125 is adjusted by a pair of dual direction spout positioners 118 and 119. Each dual direction spout positioner 118, 119 provides longitudinal and lateral adjustment of its respective loading spout 124, 125. Dual direction spout positioners 118 and 119 are commercially available from DCL, Inc for example under model numbers HPD-32-1X1, HPD-32-2X2, HPD-32-4X2, and HPD-32-6X2. It should be understood that dual direction positioners 118, 119 may provide equal lateral and longitudinal movement of loading spout 124, 125 or may provide greater adjustment in one of the X direction and the Y direction.

Centering and loading apparatus 110 includes a locator assembly 135 which is movably supported on a pair of parallel, spaced apart tracks or rails 130 and 132. However, locator assembly 135 is independently movable from loading spouts 124 and 125. In this embodiment, loading spouts 124, 125 have a smaller range of motion than in the previous embodiment but are supported in a frame 118a, 119a and driven by first and second drivers 118b, 118c, 119b, 119c, respectively, that provide longitudinal and lateral adjustment of loading spouts 124, 125 over a smaller but discrete area of the loading bay 111, as compared to the first embodiment.

Locator assembly 135 is a similar construction to locator assembly 35 of the previous embodiment; therefore reference will be made to locator assembly 35 for further details of the housing 143 and mounting of scanning devices 140 and 142 in housing 143. In contrast to the first embodiment of locator assembly housing 43, locator assembly housing 143 is not mechanically coupled to loading spout 124 and instead is independently supported on a movable support 128. Support 128 is movably supported by rails 130 and 132 on a plurality of bearing assemblies 134 and moved along rails by an X-axis driver 131, such as an air cylinder, servo motor, AC frequency drive motor, pneumatic motor, or the like. Furthermore, locator assembly 135 is movably mounted to movable support 128 on a pair of rails 128c to permit locator assembly 135 to move laterally with respect to rails 130 and 132. Similarly, scanning assembly housing 143 is moved along rails 128c by a Y-axis driver 133, such as an air cylinder, servo motor, pneumatic motor or the like.

Locator assembly 135 is controlled by a PLC 178, which moves locator assembly 135 from a home position along the X- axis to detect the presence and approximate location of an open hatch, for example open hatch 16. Following the same sequence of steps described in reference to the first embodiment, locator assembly 135 identifies and locates the center of rearward open hatch 16 so that PLC 178 can send signals to dual direction positioner 119 to align loading spout 125 over opening 16 and to actuate the loading sequence for storage compartment 14, if simultaneous loading is not desired. After centering and, optionally loading compartment 14, PLC 178 moves locator assembly 135 to seek out and locate the center of the second or forward open hatch 15 of truck 12. Again, after the center of open hatch 15 is located, PLC 178 actuates dual direction positioner 118 to center loading spout 124 over open hatch 15. After loading spout is centered, PLC 178 actuates the loading cycle.

Optionally, centering and loading apparatus 110 may include a conventional traffic signal 179 which is coupled to PLC 178. When vehicle 12 approaches loading bay 111 and compartments 13 and 14 pass under dual direction spout positioner 119, scanning device 140 sends PLC 78 a "HATCH DETECTION" signal when opening 15 is detected. In response to this first signal, PLC 178 generates and sends a signal to light 179 to actuate the yellow light, which indicates to the driver to slow vehicle 12. When the second opening is detected, scanning device 140 sends a second "HATCH DETECTION" signal to PLC 178, which in turn generates and sends a signal to signal light 179 to actuate the red light, which indicates to the driver to stop vehicle 12. After vehicle 12 is stopped, the locating and centering sequence is initiated by PLC 178. After the loading sequence is complete, PLC 178 operates and sends a signal to signal light 179 to generate the green light to indicate to the driver that he or she can close the hatches and then exit loading bay 111.

Figure 10:
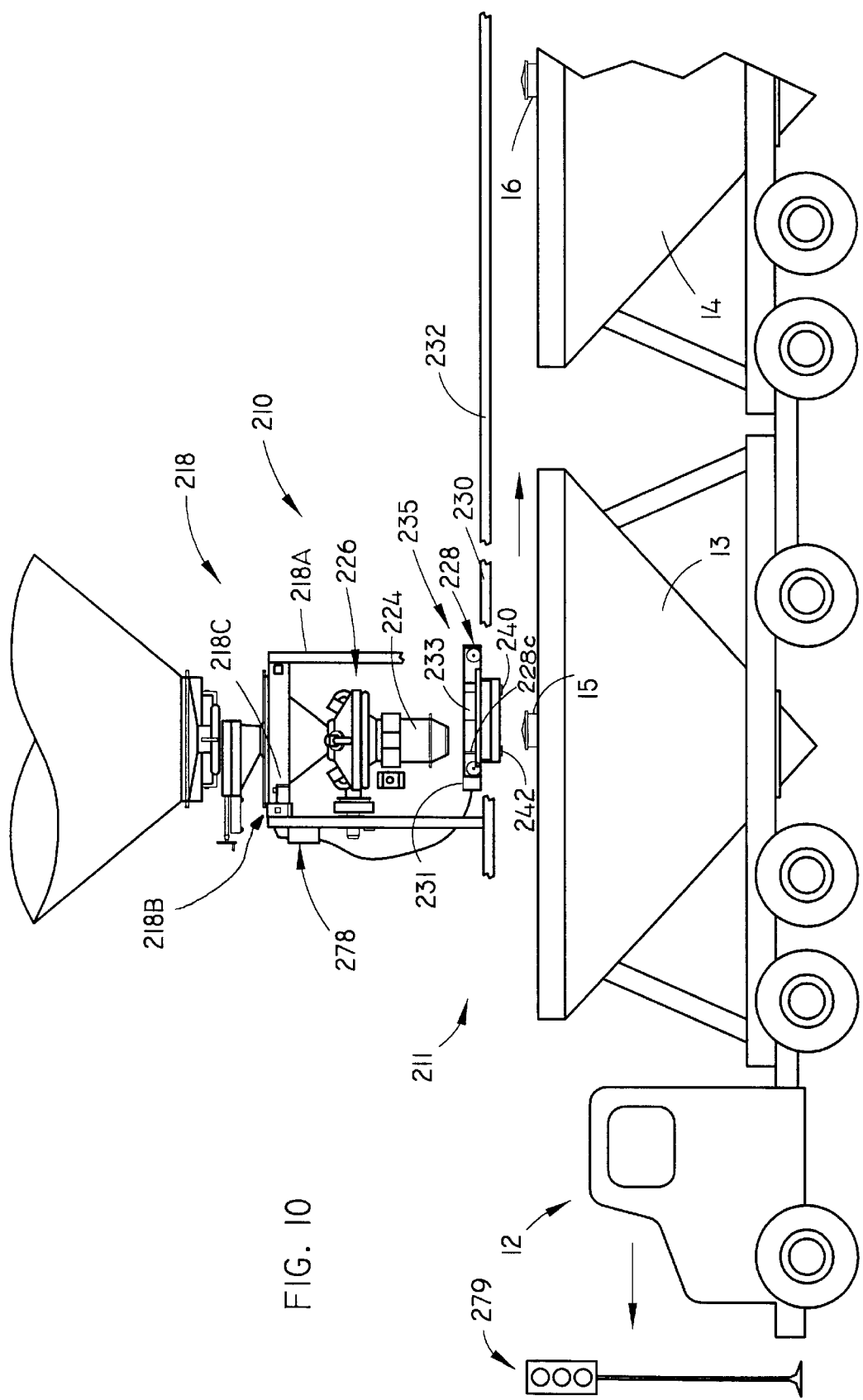
FIG. 10 is a side elevational view of the vehicle positioned in the loading area under a third embodiment of the present invention.

In yet another embodiment shown in FIG. 10, centering and loading apparatus 210 may include a single extendable loading spout 224 which is supported on a dual direction or rotary spout positioner 218 in loading bay 211. Dual direction spout position 218 includes a frame 218a on which loading spout 224 is movable supported and driven by first and second drivers 218b and 218c. Similar to the second embodiment, centering and locating apparatus 210 includes a locator assembly 235 which is independently movable from loading spout 224 and is movably supported on a pair of parallel, space apart tracks or rails 230, 232 in the loading bay 211 by a support 228 and driven along rails 230, 232 by a suitable X-axis driver 231. Similar to the previous embodiment, locator assembly 235 is movably mounted to support 228 on a pair of rails 228c and driven therealong by a Y-axis driver 233. In this manner, the position of locator assembly 235 can be adjusted along the longitudinal and lateral horizontal axes of rails 230 and 232. With the exception of the orientation of scanning devices 240, 242, locator assembly 235 is similar to the construction of scanning assemblies 135 and 35 and, therefore, reference is made to locator assembly 35 for the details of construction.

In this embodiment lead scanning device 240, which corresponds to scanning device 40, is positioned downstream from position scanning device 242 so that when vehicle 12 first enters loading bay 211, the lead scanning device 240 will encounter the forward open hatch 15 before position scanning device 242, as will more fully understood in reference to the description of operation below.

Centering and locator apparatus 210 also includes a PLC 278 which controls a conventional traffic signal light 279 in addition to dual axis positioner 218 and locator assembly 235. Since a single loading spout 224 is provided, vehicle 12 must be moved from a first loading position in loading bay 211 where forward open hatch 15 is generally aligned with loading spout 224 to a second loading position where rearward open hatch 16 is generally aligned with loading spout 224. The driver of vehicle 12 is guided by traffic signal light 279 which uses the green light to signal the driver to move forward at a first speed, the yellow or amber light to signal the driver to move at a second, slower speed or crawl pace, and the red light to signal the driver to stop.

In this manner, PLC 278, together with traffic signal light 279, provides direction to the driver of the vehicle 12 to move vehicle 12 into the first position in the loading bay 211 until the scanning device 240 of locator assembly 235 detects the edge of the open hatch 15. Upon detection of the open hatch 15, scanning device 240 generates a "HATCH DETECTION" signal to the PLC 278, which in turn generates a signal to traffic light 279 to actuate the yellow light which signals the vehicle operator to slow down to the second speed. Vehicle 12 proceeds slowly until scanning device 242 detects the edge of the open hatch 15 at which point scanning device 242 sends a second "HATCH DETECTION" signal to PLC 278, which in turn generates a signal to traffic light 279 to actuate the red right to signal driver to stop.

After vehicle 12 is stopped, scanning device 242 follows a similar sequence to that of the first embodiment and initially scans the opening along the Y-axis to locate the coordinates of the edges of opening 15, which are sent to PLC 278. PLC 278 moves scanning device 242 to the centerline of opening 15 X-axis and rotates scanning device 242 so that it can scan the edges of opening 15 along the Y-axis so that the center of opening 15 can be calculated by PLC. After scanning opening 15, PLC 278 returns locator assembly 235 back to its home position, ready for scanning second opening 16. After calculating the center of the hatch, PLC 278 directs a signal to the dual directional spout positioner to X-axis and Y-axis drivers 231 and 233 as needed to center the loading spout 224 over the open hatch of vehicle 12. After loading spout 224 is aligned over open hatch 15, PLC 278 starts the fill process by lowering spout 224 in the same manner as spout 24 in embodiment 10.

After storage chamber 13 is filled, PLC 278 withdraws or raises spout 224 and actuates the green light of traffic signal light 279 to direct the driver to move the truck forward to the second loading position in loading bay 211. In a similar manner, locator assembly 235 moves along rails 230 and 232 to scan for second open hatch 16. After second open hatch 16 is detected by scanning device 240, PLC 278 actuates the yellow or amber light of traffic signal light 279 to direct the driver to move at a slow speed until scanning device 242 detects the opening 16, at which point PLC 278 generates a signal to traffic signal light 279 to actuate the red light. The same sequence of steps described in reference to opening 15 are used to determine the center of opening 16.

After compartment 14 is filled and the loading process is stopped, PLC 278 with draws and raises spout 224 and generates a signal to traffic signal light 279 to actuate the green light to signal to the driver to close the hatches and move vehicle 12 forward out of the loading bay 211.

Although the present invention has been described in reference to a single dual trailer truck, it should be understood that the present invention may be used in numerous other applications, including other vehicles, such as trains, boats, or the like. Furthermore, other articulating conveyor arrangements or positioning devices may be used to move the loading spout into alignment with the open hatch of the vehicle. Moreover, locator assemblies 35, 135, or 235 may include other scanning devices, such as radio frequency, laser, and infrared devices, or the like, and other controller devices to receive the signals from the scanning devices and to generate signals to actuate the movement of the loading spout. It is understood that modification of the invention will occur to those skilled in the art and to those who make and use this convention. Therefore, it can be appreciated that embodiments shown in the drawings and described above are merely for illustrative purposes and are not intended to limit the scope of the invention which is defined by the following claims.

For the purposes of the preceding description, the terms "up," "down," "upper," "lower," "vertical," "horizontal," and derivatives or equivalents thereof shall relate to the invention as oriented in FIGS. 1 to 10. It is understood that the invention may assume various alternative orientations, except where expressly specified to the contrary.

What is claimed is:

1. A bulk loading system for delivering bulk material to a storage compartment of a bulk transport vehicle through a fill opening, the bulk loading system comprising:

a first support defining a first direction of movement and a second direction of movement;

a movable loading spout assembly adapted to move in at least one of said first direction of movement and said second direction of movement for centering said loading spout assembly over the fill opening of the vehicle; and at least one scanning device for scanning and locating the fill opening of the vehicle, said scanning device being coupled to said movable loading spout assembly and adapted to actuate said loading spout assembly for centering over the fill opening of the vehicle.

2. A bulk loading system according to claim 1, wherein said scanning device is mechanically coupled to said loading spout assembly.

3. A bulk loading system according to claim 2, said loading spout assembly and said scanning device being coupled by and respectively supported on a movable support, said movable support being adapted to move along said first support along direction of movement and being adapted to move said loading spout assembly and said scanning device along said second direction of movement.

4. A bulk loading system according to claim 3, wherein said scanning device is offset along said first direction of movement from said movable support whereby said loading spout assembly may be positioned for engaging the vehicle over the fill opening for delivering the material through the fill opening into the storage compartment of the vehicle.

5. A bulk loading system according to claim 1, further comprising a second scanning device, said at least one scanning device comprising a first scanning device, said second scanning device being spaced from said first scanning device along said first direction of movement, said first scanning device for initially scanning and identifying the fill opening, and said second scanning device for measuring the dimensions of the fill opening for locating the center of the fill opening.

6. A bulk loading system according to claim 5, wherein said first and second scanning devices are supported in a housing.

7. A bulk loading system according to claim 6, wherein said second scanning device is adapted to rotate in said housing, said second scanning device rotating in said housing from a first position wherein said second scanning device is aligned for measuring the fill opening along said first direction of movement to a second position wherein said second scanning device is aligned for measuring the fill opening along said second direction of movement.

8. A bulk loading system according to claim 7, wherein said second scanning device is adapted to rotate in said housing ninety degrees between said first and second positions.

9. A bulk loading system according to claim 8, wherein said second scanning device is mounted in said housing on bearings.

10. A bulk loading system according to claim 8, further comprising a pair of stops to limit the rotational movement of said second scanning device between said first position and said second position.

11. A bulk loading system according to claim 7, wherein said scanning device is rotated in said housing by a driver, said driver being drivingly coupled to said second scanning device.

12. A bulk loading system according to claim 11, wherein said driver comprises a motor.

13. A bulk loading system according to claim 12, wherein said motor is drivingly coupled to said second scanning device by one of a belt and a gear.

14. A bulk loading system according to claim 13, wherein said motor is drivingly coupled by a belt, said belt comprising one of a toothed timing belt and a gear driven belt.

15. A bulk loading system according to claim 5, further comprising a controller, said controller being in communication with said first and second scanning devices and said loading spout assembly and generating actuating signals in response to signals from said first and second scanning devices to move said loading spout assembly for aligning said loading spout assembly with the fill opening.

16. A bulk loading system according to claim 15, wherein said controller comprises a programmable logic controller.

17. A bulk loading system according to claim 1, wherein said loading spout assembly incudes an extendable loading spout.

18. A bulk loading system according to claim 17, wherein said extendable loading spout includes a sealing cone for sealing against the fill opening of the vehicle.

19. A bulk loading system according to claim 1, wherein said scanning device is electronically coupled to said loading spout assembly.

20. A bulk loading system according to claim 19, wherein said scanning device includes a first scanning device and a second scanning device, said first scanning device for detecting the presence of the fill opening, and said second scanning device for locating the center of the fill opening of the vehicle.

21. A bulk loading system according to claim 20, wherein each of said scanning devices includes charged coupled devices, said charged coupled devices generating signals wherein the magnitude of each signal is a function of the intensity of the reflective light off the vehicle.

22. A bulk loading system according to claim 20, further comprising a driver, said driver moving said loading spout assembly for substantially aligning with the fill opening, said first scanning device and said second scanning device each generating positioning signals, and said positioning signals being adapted to actuate said driver to move said loading spout assembly.

23. A bulk loading system according to claim 22, further comprising a controller in communication with said first scanning device and said second scanning device, said first scanning device and said second scanning device sending said positioning signals to said controller, and said controller generating signals for actuating said driver to move said loading spout assembly for centering over the fill opening.

24. A bulk loading system according to claim 19, wherein said loading spout assembly includes a movable discharge spout, said movable discharge spout being adapted to move along said longitudinal horizontal axis and said lateral horizonal axis of said first support.

25. A bulk loading system according to claim 19, said loading spout assembly including a delivery conveyor and a movable loading spout, said delivery conveyor including a product inlet, and said delivery conveyor for directing the bulk material from the product inlet to the movable loading spout.

26. A bulk loading system according to claim 19, wherein said scanning device is supported in a housing, said housing being adapted to move along said longitudinal horizontal axis of said first support.

27. A bulk loading system according to claim 26, wherein said housing includes a plurality of bearing members, said bearing members engaging said first support.

28. A bulk loading system according to claim 27, wherein said scanning device is moved along said first support by a driver with a position feedback.

29. A bulk loading system according to claim 28, wherein said driver comprises one of a servo motor, AC frequency drive motor, air motor, air cylinder, and pneumatic motor.

30. A bulk loading system according to claim 19, wherein said scanning device is independently movable with respect to said loading spout assembly.

31. A bulk loading system according to claim 19, wherein said loading spout assembly includes an extendable spout and a first driver, said scanning device being electronically coupled to said first driver, and said first driver moving said extendable spout along said first direction of movement in response to signals generated by said scanning device.

32. A bulk loading system according to claim 31, wherein said loading spout assembly includes a second driver, said scanning device electronically coupled to said second driver, and said second driver moving said spout along said second direction of movement of said support in response to signals generated by said scanning device.

33. A bulk loading system according to claim 1, wherein said first direction of movement includes a longitudinal horizontal axis, and said second direction of movement includes a lateral horizontal axis.

34. A bulk loading system for delivering bulk material to a storage compartment of a bulk transport vehicle through at least one fill opening provided in the body of the vehicle, the bulk loading system comprising:

a first support having a longitudinal horizontal axis and a lateral horizontal axis;

a movable loading spout assembly adapted to move along said longitudinal horizontal axis by a first driver and adapted to move along said lateral horizontal axis of said first support by a second driver for centering said loading spout assembly over the fill opening of the vehicle; and a pair of scanning devices coupled to said first and second drivers and being adapted to move along said longitudinal horizontal axis and said lateral horizontal axis of said first support for scanning the vehicle, said scanning devices being spaced apart and aligned along said longitudinal horizontal axis, a first scanning device of said pair of scanning devices being adapted to scan the vehicle for detecting the presence of the fill opening, a second scanning device of said pair of scanning devices being adapted to locate the center of the fill opening, and said pair of scanning devices adapted to actuate said drivers to move said loading spout assembly for aligning with the center of the fill opening of the vehicle.

35. A bulk loading system according to claim 34, wherein said scanning devices comprise charge coupled device cameras, said charge coupled device cameras for measuring light reflected off the vehicle and generating signals proportional to the measured light to detect the location of the opening and to measure the coordinates of the fill opening.

36. A bulk loading system according to claim 35, further including at least one light for directing light toward the vehicle to enhance the contrast between the body of the vehicle and the fill opening.

37. A bulk loading system according to claim 34, wherein said scanning devices are mounted in a housing, said second scanning device being rotatably mounted in said housing and being adapted to rotate between a first position for measuring the dimensions of the opening along said lateral horizontal axis and a second position for measuring the dimensions of the opening along said longitudinal horizontal axis.

38. A bulk loading system according to claim 37, wherein said loading spout is movably supported on a second support, said housing being cantilevered from said second support for positioning said pair scanning devices ahead of said movable loading spout.

39. A bulk loading system according to claim 37, wherein said housing is independently movable from said movable loading spout.

40. A bulk loading system according to claim 34, further comprising a controller, said controller being coupled to said first scanning device and second scanning device and said first driver and said second driver, said controller being adapted to receive signals from said from said first scanning device and said second scanning device and to actuate said first driver and said second driver in response to said signals to move said loading spout for aligning said loading spout with the center of the fill opening.

41. A bulk loading system according to claim 40, wherein said controller receives a first detection signal from said first scanning device and a second detection signal and a plurality of measuring signals from said second scanning device, said controller actuating said first driver to move said loading assembly at a first speed for initially locating the fill opening and actuating said first driver to move said loading assembly at a second speed when said second signal is detected, and said controller being adapted to determine the coordinates of the center of the opening from said measuring signals and actuating said first driver and said second driver in response to said measuring signals to align said loading spout with the center of the fill opening.

42. A bulk loading system according to claim 40, wherein said pair of scanning devices are independently movable from said loading spout, said pair of scanning devices being supported on said first support by a movable support, said movable support being moved along said first support by a third driver, and said scanning devices being movably supported on said second support and being moved along said movable support by a fourth driver.

43. A bulk loading system according to claim 42, further comprising a controller, said controller being coupled to said first scanning device and second scanning device and said first, second, third, and fourth drivers, said controller being adapted to receive a first detection signal from said first scanning device and a second detection signal and a plurality of measuring signals from said second scanning device, said controller actuating said third driver to move said pair of scanning devices at a first speed for initially locating the fill opening and actuating said fourth driver to move said scanning devices at a second speed when said second signal is detected, and said controller being adapted to determine the coordinates of the center of the opening from said measuring signals and actuating said first driver and said second driver in response to said measuring signals to align said loading spout with the center of the fill opening.

44. A method of centering and loading bulk material into a storage compartment of a bulk transport vehicle through a fill opening, said method comprising the steps of:

providing a scanning device, the scanning device generating signals in response to light reflected from the vehicle;

moving the scanning device adjacent the vehicle;

scanning the vehicle with the scanning device in at least two directions to locate the fill opening;

locating the center of the fill opening from signals generated by the scanning device; and in response to said signals, aligning a loading spout with center coordinates of the fill opening.

45. A method of centering and loading according to claim 44, wherein scanning includes measuring the distance from the center of the scanning device to the edges of the opening for locating the center coordinates of the opening.

46. A method of centering and loading according to claim 45, wherein aligning the loading spout includes calculating the center coordinates of the fill opening from the coordinates of the opening and driving the loading spout to align with the center of the fill opening.

47. A method of centering and loading according to claim 46, wherein scanning the vehicle includes:

providing a second scanning devices;

scanning the vehicle with the first scanning device at a first speed to locate the fill opening;

scanning the vehicle with a second scanning device at a second speed until the second scanning device locates the fill opening;

stopping the pair of scanning devices and measuring the distance from the center of the second scanning device to the edges of the opening along a first chord of the opening with the second scanning device to determine the center of the chord;

moving the second scanning device to the center of the first chord;

rotating the second scanning device and measuring the distance from the center of the second scanning device to the edges of the opening along a second chord; and determining the center coordinates of the opening from the centers of the first and second chords.

48. A method of centering and loading according to claim 47, wherein scanning includes scanning the vehicle with the first scanning device at a faster speed than the second scanning device.

49. A method of centering and loading according to claim 44, wherein scanning includes measuring light reflected off the vehicle.

50. A method of centering and loading according to claim 49, further comprising directing light toward the vehicle to increase the contrast between the light reflected off the body of the vehicle and the light reflected from the fill opening.

* * * * *

UNITED STATES PATENT AND TRADEMARK OFFICE
CERTIFICATE OF CORRECTION

PATENT NO. : 5,881,780
DATED : March 16, 1999
INVENTOR(S) : Reinhard Matye and Evard John Heath It is certified that error appears in the above-identified patent and that said Letters Patent is hereby corrected as shown below:

Column 1, line 1:

"APAPRATUS" should be --APPARATUS--.

Column 6, line 48:

Please delete "30".

Column 9, line 26:

Please delete "fall" and insert in lieu thereof --full--.

Signed and Sealed this

Twenty-third Day of May, 2000

*Attest:*

Q. TODD DICKINSON

*Attesting Officer*   *Director of Patents and Trademarks*